Jan. 7, 1941. H. G. DEWEY ET AL 2,227,962
PAPER CUTTING MACHINE
Filed Aug. 31, 1939 7 Sheets-Sheet 1
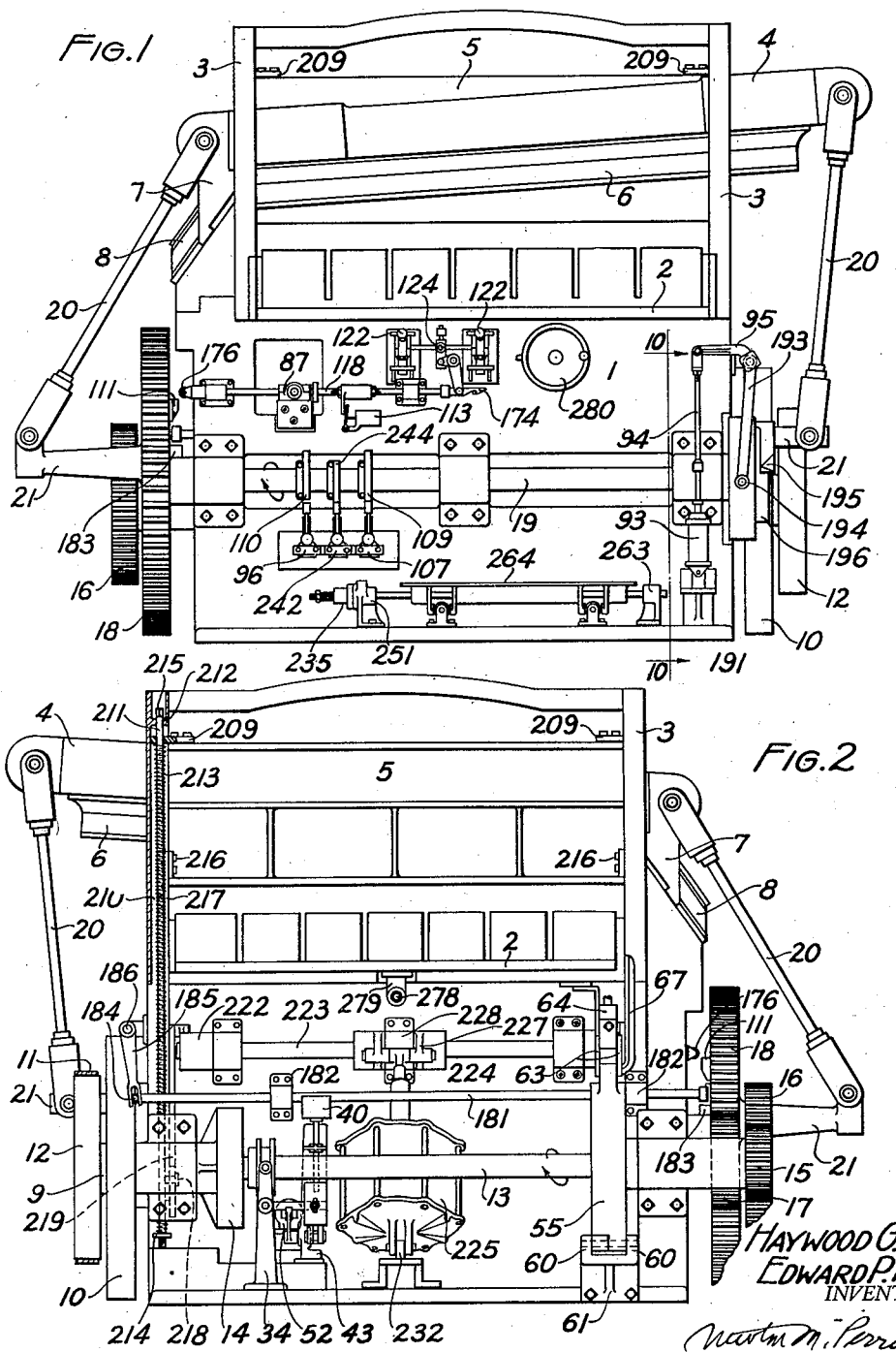
HAYWOOD G. DEWEY
EDWARD P. FLYNN
INVENTORS
BY
ATTORNEYS

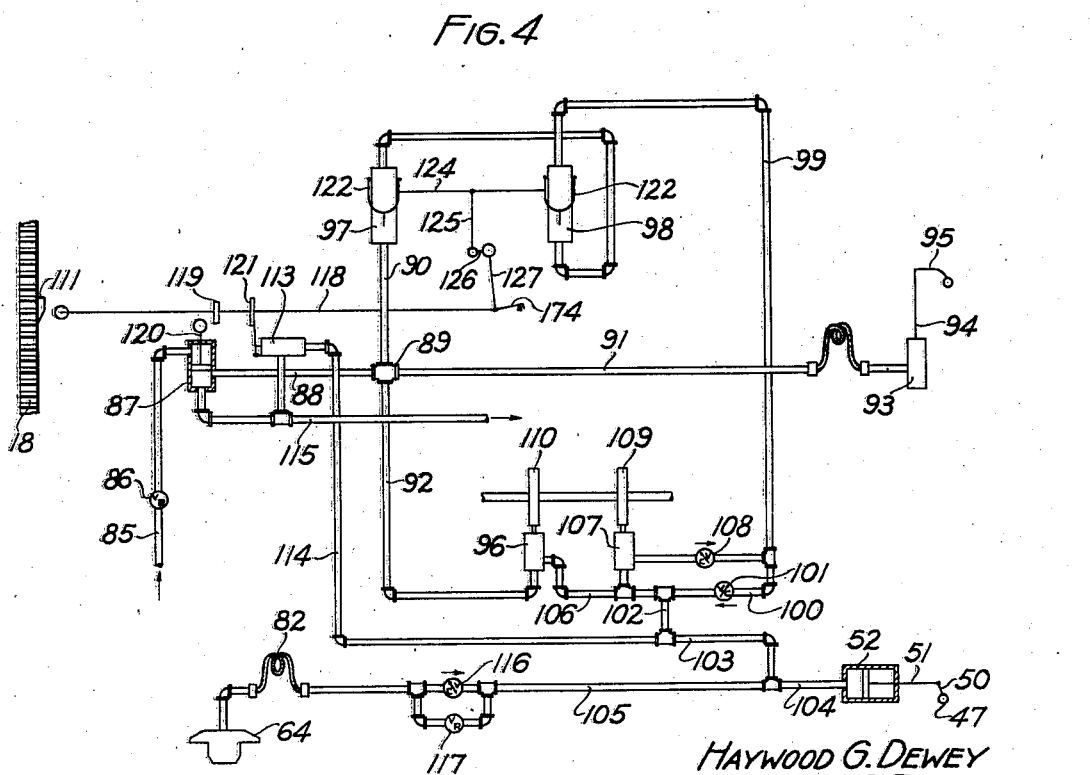

Jan. 7, 1941.   H. G. DEWEY ET AL   2,227,962
PAPER CUTTING MACHINE
Filed Aug. 31, 1939   7 Sheets-Sheet 3
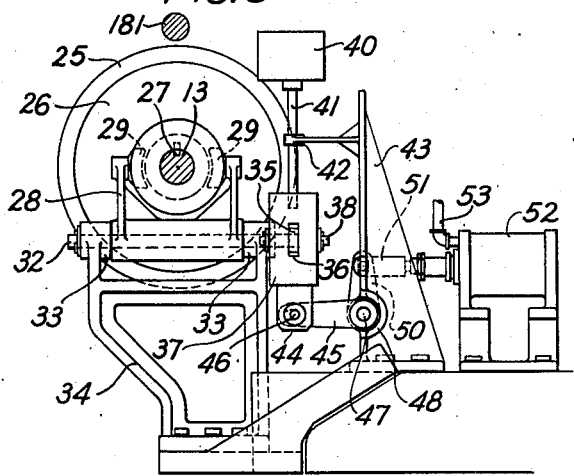
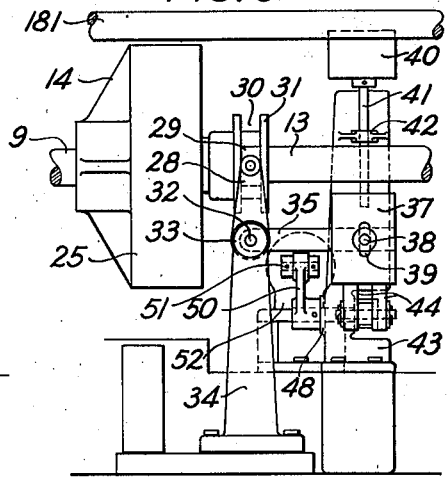
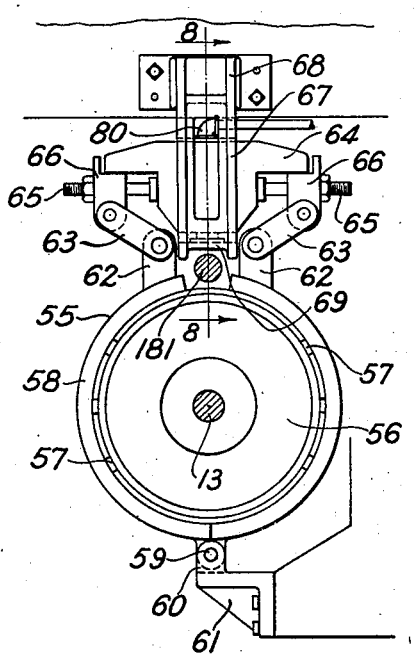
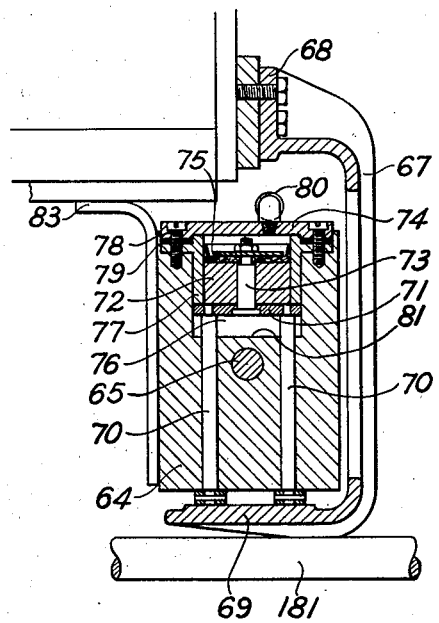
HAYWOOD G. DEWEY
EDWARD P. FLYNN
INVENTORS
BY
ATTORNEYS

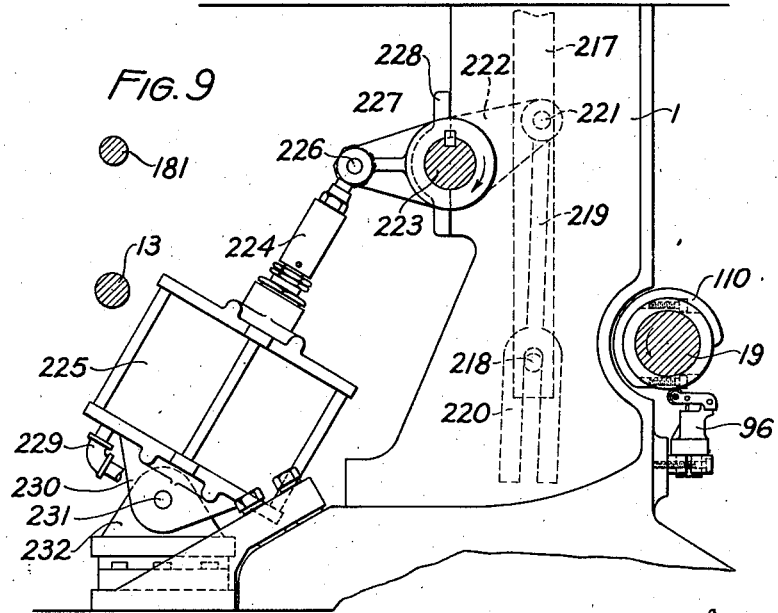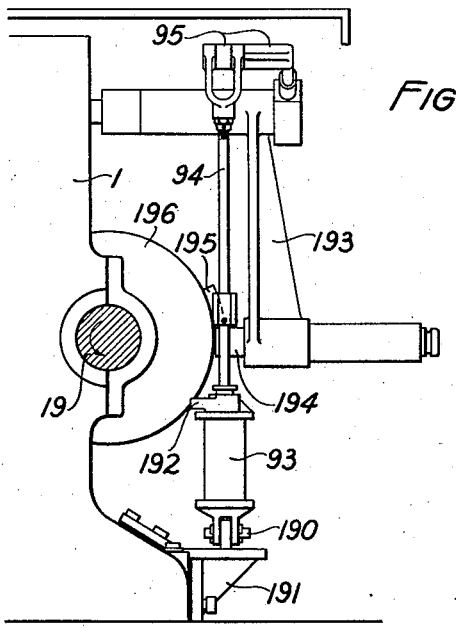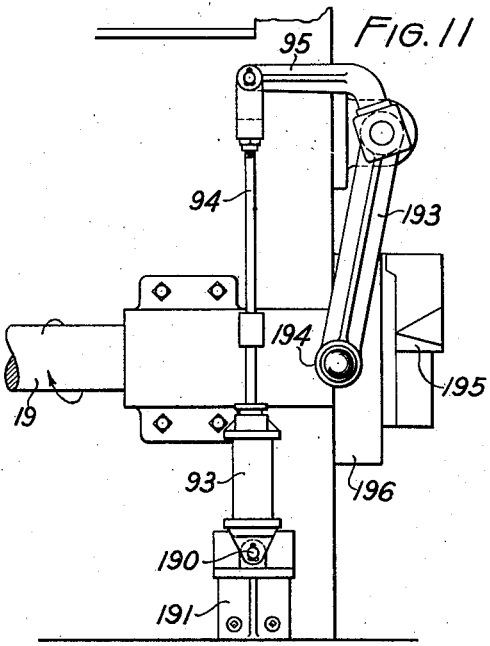

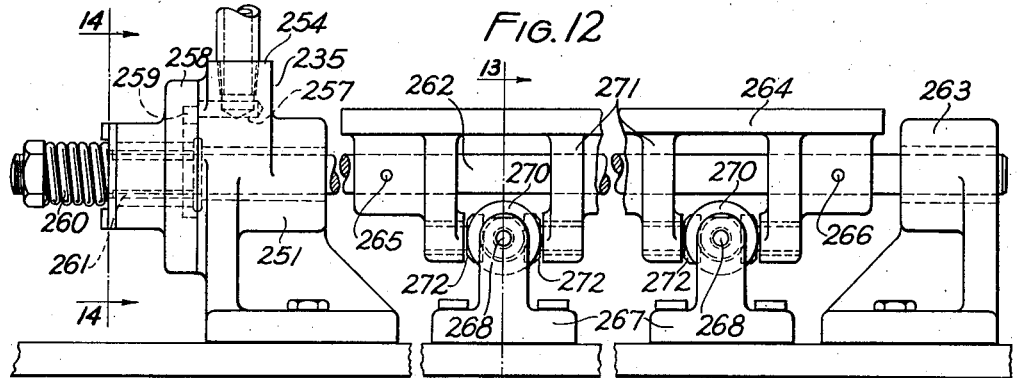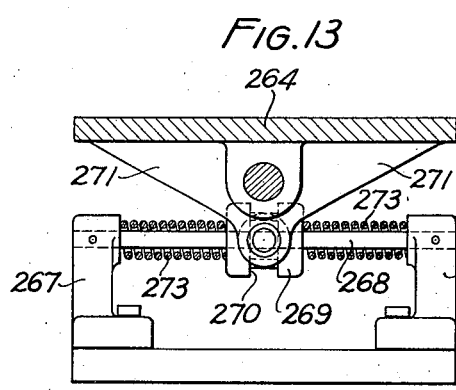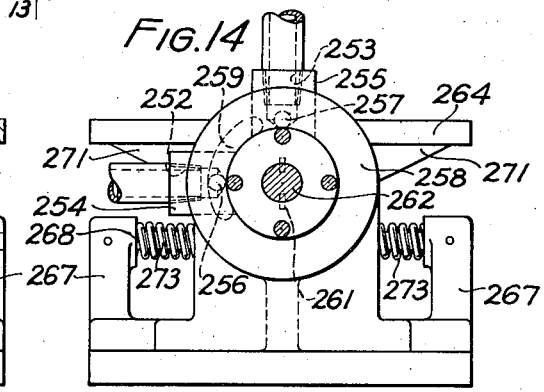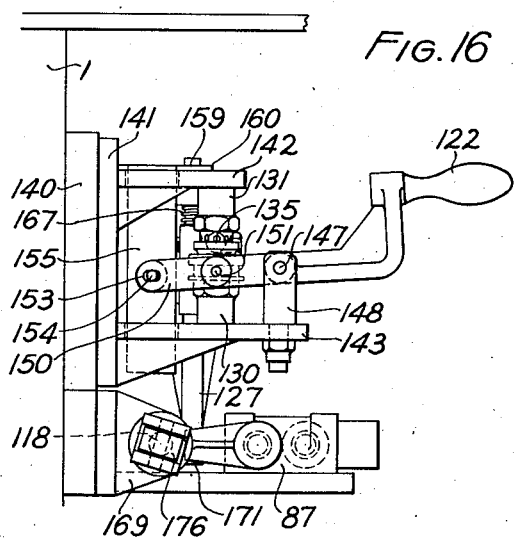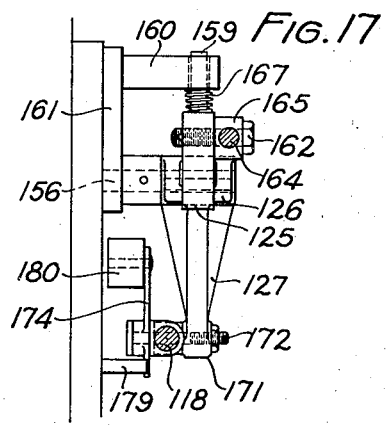

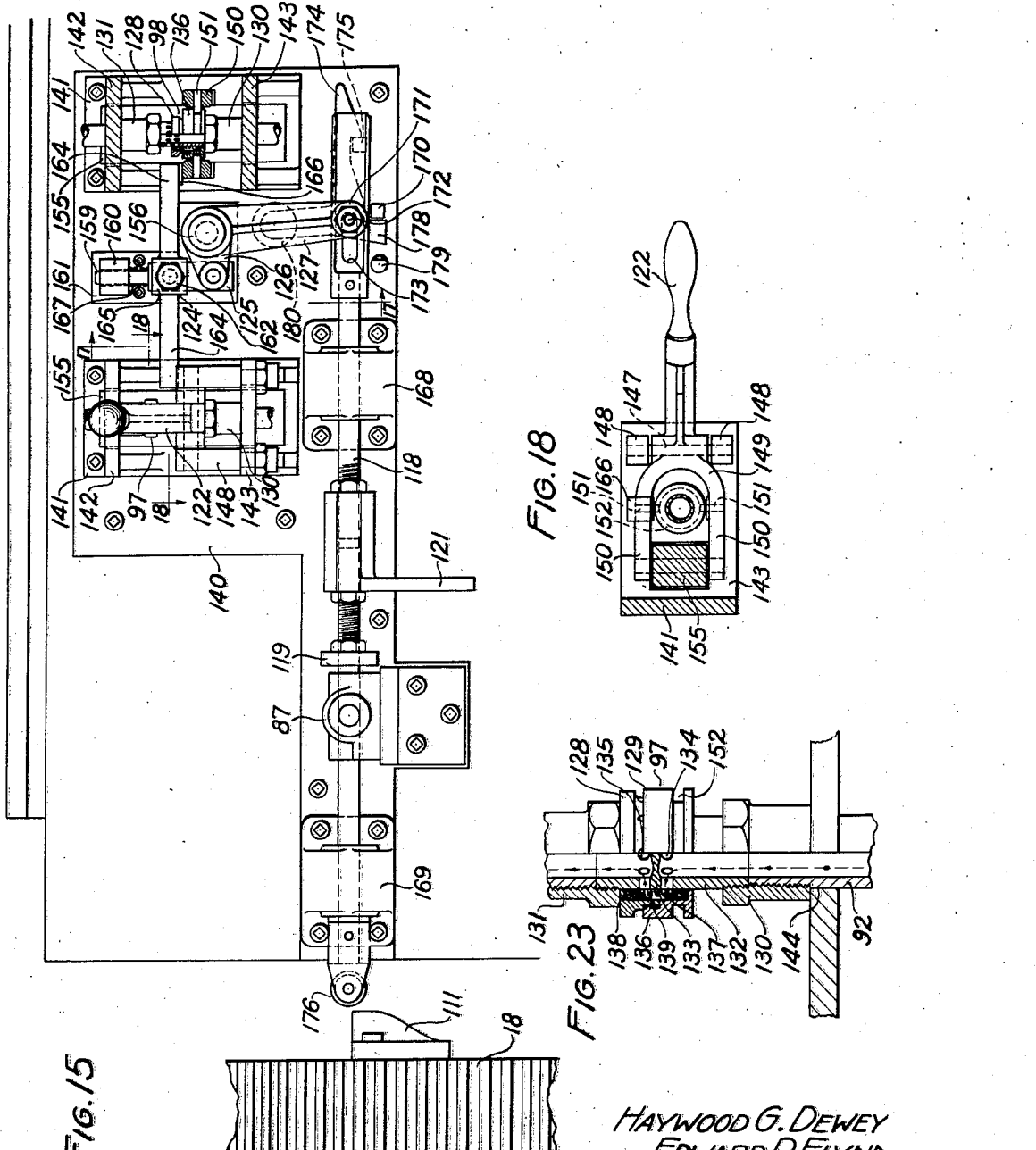

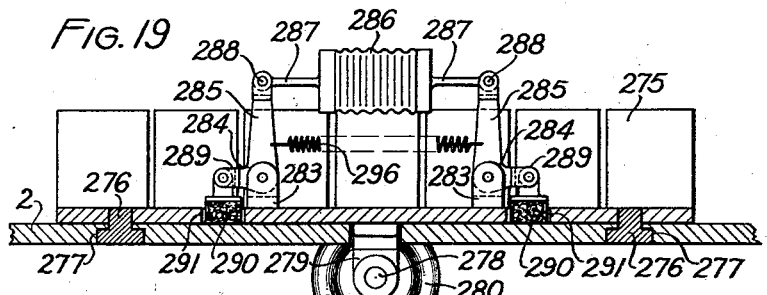

Patented Jan. 7, 1941

2,227,962

UNITED STATES PATENT OFFICE 2,227,962

PAPER CUTTING MACHINE

Haywood G. Dewey and Edward P. Flynn, Rochester, N. Y., assignors to Eastman Kodak Company, Rochester, N. Y., a corporation of New Jersey Application August 31, 1939, Serial No. 292,865

25 Claims. (Cl. 192—131)

The present invention relates to improvements in machines for cutting sheet material, and particularly to a machine of this type controlled by a two-handed safety fluid operated control, and in which the material to be cut is clamped during the cutting operation by a clamp operated by a fluid medium, said clamp being operated in timed relation with a cutting stroke of the knife.

Two-handed safety controls operated by a fluid medium are not broadly new, as evidenced by the disclosure in pending U. S. patent application Serial Number 193,901, Haywood G. Dewey, entitled Safety control for square cutters, filed March 4, 1938, but the present invention relates to improvements in such safety controls.

In order to obtain an accurate and square cut of a stack of sheet material on a cutting machine of the guillotine type it is necessary to clamp the stack of material onto the table during the cutting stroke of the knife. Heretofore, paper cutting machines of the type referred to have usually been provided with wholly mechanical means for operating the clamp. Such means, while satisfactory in operation and extensively used, are objectionable because of their complexity, the fatigue brought upon the operator in working the same, and the absence of smooth easy adjustment necessary to applying a light holding pressure to the stack of material. Certain known clamping arrangements for cutting machines of this type provide a treadle operated mechanical linkage for lowering the clamp against the action of springs normally moving the clamp to its raised position to bring the clamp into holding position on top of the stack prior to the cutting operation, and in order to operate the clamp with this mechanism the operator generally has to apply practically his whole weight to the treadle. Some of these arrangements have been known to work so hard that the operator, particularly if he is small, has to jump upon the treadle to bring the clamp down upon the stack. It will be appreciated that such a procedure is not only fatiguing to the operator, but since it necessitates him leaving the floor, it is difficult, and sometimes dangerous, to operate the hand control of such a machine while off balance. In addition, the light holding pressure applied by these clamps prior to the cutting stroke need only be light since it is used for locating the stack properly under the knife, and when a clamp cannot be moved smoothly and easily to this holding position it more often serves to disrupt the stack than to hold it in the desired position, particularly if a stack of small sheets is being cut.

Therefore, one object of the present invention is to provide a cutting machine having a control operated by a fluid medium and having such control including two manually operated normally closed valves which must be operated simultaneously to start the machine.

Another object is to provide a safety control of the type referred to which includes a third valve which must be operated simultaneously with said first-mentioned two valves in order to start the machine.

And another object is to provide a control in which the third valve is operated by the manual means controlling the first two valves, and can be operated only when both of said manual means are operated simultaneously.

And yet another object is to provide a control in which the third valve is automatically closed by a driven member of the machine at the completion of a given cycle of the machine, and in which this closure of the third valve will return the manual means to a valve closing position if the same should happen to be held in valve opening position.

And still another object is to provide a latch reset arrangement in the motion transmitting means between said manually operated valve opening means and the operating member of said third valve which necessitates a return of the manual means to a valve closing position before the machine can again be operated, thereby preventing an accidental repeat of the machine.

And a further object is to provide a clamp operated by a fluid medium whereby smooth easy control of the clamp can be effected without exertion to the operator.

Another object is to provide means whereby a fluid under light pressure can be applied to the clamp to bring it into a light holding position relative to the top of the stack of material to be cut and the introduction of said light pressure can be manually controlled.

Another object is to provide means whereby a fluid under heavy pressure can be applied to the clamp for securely holding the stack during the cutting stroke of the knife.

And yet another object is to so combine said fluid operated clamp with the driving means of said knife that said heavy pressure is adapted to be automatically applied to the clamp in advance of, and maintained during, the cutting stroke of the knife.

And a further object of the present invention is to provide a combined fluid operated safety control for cutting machines, and a fluid operated clamp for use therewith which are relatively simple in construction and operation compared with known arrangements for accomplishing the same results, and which can be applied to existing cutting machines without necessitating a great amount of alterations in such machines.

The novel features that we consider characteristic of our invention are set forth with particularity in the appended claims. The invention, itself, however, both as to its organization and its methods of operation, together with additional objects and advantages thereof, will best be understood from the following description of specific embodiments when read in connection with the accompanying drawings in which Fig. 1 is a front elevation of a known type of cutting machine, and having incorporated thereon a two-handed fluid operated safety control constructed in accordance with a preferred embodiment of the present invention, Fig. 2 is a rear elevation of the same cutting machine, and showing a fluid operated means for operating the clamp constructed in accordance with a preferred embodiment of the present invention applied thereto, Fig. 3 is a diagrammatic showing of the fluid operating means for the clamp and the control therefor, and showing its combination with the knife driving mechanism, Fig. 4 is a diagrammatic showing of the fluid operated control for the knife driving mechanism and the knife control therefor, Fig. 5 is an enlarged end elevation of the clutch, and showing the means for operating the same, Fig. 6 is a front elevation of the clutch and operating means therefor, shown in Fig. 5, Fig. 7 is an enlarged end elevation of a known type of gravity actuated brake, and showing a means for operating the same by a fluid medium, Fig. 8 is an enlarged section taken substantially on line 8—8 of Fig. 7, and showing the manner in which the brake is modified so as to make it fluid operated, Fig. 9 is an enlarged view taken substantially on line 9—9 of Fig. 2, and showing the manner of connecting the fluid operated cylinder to the clamp, and indicating its relation with respect to other parts of the machine, Fig. 10 is an enlarged view taken substantially on line 10—10 of Fig. 1, and showing the structure for alternately removing and inserting a lock pin from, and into, respectively, the path of the bull gear, Fig. 11 is a front elevation of the structure shown in Fig. 10, Fig. 12 is an enlarged front elevation of the treadle operated valve for the clamp fluid control system, Fig. 13 is a section taken on line 13—13 of Fig. 12, Fig. 14 is a section taken substantially on line 14—14 of Fig. 12, Fig. 15 is a front elevation, partly in section, of the manual safety control for the fluid operating system for starting and stopping the machine, and showing said control in relation to parts of the driven mechanism of the machine which are adapted to periodically operate the same to add to the safety features thereof, Fig. 16 is a side elevation of the hand control shown in Fig. 15, taken from the left-hand side of Fig. 15, and omitting the parts of the driven mechanism of the machine for the purposes of clarity, Fig. 17 is a section taken substantially on line 17—17 of Fig. 15, Fig. 18 is a section taken substantially on line 18—18 of Fig. 15, Fig. 19 is a section taken across the table of the machine behind the back gauge, and showing one embodiment of a fluid operated means for clamping the back gauge in adjusted position on the table, Fig. 20 is a side elevation of the fluid operating means for clamping the back gauge, shown in Fig. 19, and showing how the same is operated from the front of the machine, Fig. 21 is a plan view of a modified fluid operating means for clamping the back gauge to the table, Fig. 22 is a side view of the modification shown in Fig. 21, and shown partly in section and partly in elevation to clearly illustrate the operation of the same, and Fig. 23 is an enlarged sectional view of one of the hand operated valves, and showing the same in its open position.

Like reference characters refer to corresponding parts throughout the drawings.

Although the safety control system and fluid operated clamp constituting the present invention may be used on any type of cutting machine requiring protection of the operator and a clamping of the work, for the purpose of illustration they have been shown applied to a well-known cutting machine the operating parts of which are mounted in a solid casting 1 forming a supporting frame for the various shafts and operating mechanisms of the machine. Upon the upper portion of the framework above the horizontal table 2 are the side standards 3, 3 for holding and guiding the knife carrier 4 and the clamp 5. A knife 6 is secured to the lower margin of the knife carrier. The clamp and knife are adapted to reciprocate in the side standards 3, 3, as is well known in the art, and as will be more clearly pointed out hereinafter so far as the clamp sliding is concerned, the clamp moving downwardly to clamp the stack of sheet material, not shown, before, and during, the cutting operation. The knife carrier 4 is given a diagonal, or shearing, movement by means of a guide member 7 thereon engaging in the diagonal guide slot 8 in the frame.

Mounted in suitable bearings in the rear of the machine, see Fig. 2, is the power shaft 9, bearing the fly wheel 10, which shaft receives its power from a belt 11 and pulley 12 from a motor, not shown. The driving power is communicated, as will be hereinafter fully described, from the power shaft 9 to a driven shaft 13 through a suitable clutch 14, and from the driven shaft 13 through a train of gears 15, 16, and 17 to a bull gear 18 which is fixed to one end of the bull gear shaft 19 journaled in the front of the machine frame by suitable bearings. The knife carrier 4 is coupled at each end outside of the frame by pulling bars 20, 20 with crank pins 21, 21 on each end of the bull gear shaft 19 under the rotation of which the knife 6 attached thereto is reciprocated during the operation of the machine.

The foregoing general description of the cutting machine and its operation is common to any cutting machine of this type, and is merely disclosed to give a basis for the following more detailed description of certain parts of the machine and their cooperation, which parts are combined to make up the novel safety control system constituting a part of the present invention. When cutting machines of this type are in use, the power shaft 9 is constantly driven by the motor and the knife is periodically set into operation by clutching the driven shaft 13 to the power shaft 9. The knife driving mechanism is generally automatically stopped in its upper position as shown after a given cycle of the knife has been completed, and a stopping of the knife is effected by a brake acting on a part of the driven mechanism, such for example as driven shaft 13. For effectively starting and stopping the knife, the clutch and brake must be operated in timed relation, or stating it more clearly, the brake must be released at the same time the clutch is engaged to start the machine, or vice versa for stopping the machine. In certain known machines of this type the clutch and brake are operated by a manually operated mechanical control, and in which, due to the alternate simultaneous operation of the clutch and brake required, the operating means for the two are interconnected so that the satisfactory operation of one depends upon the proper adjustment and operation of the other. Such a mechanical arrangement is satisfactory so long as both the clutch and brake are properly adjusted and function as they are supposed to, but it will be obvious to one skilled in the art that if for any reason one of the members fails to operate as it is designed to do, for instance the clutch, the other member, or brake, will not operate, and the safety of the operator is thus impaired to the extent that many serious accidents do occur. Such manually operated mechanical control systems, in addition to possessing the above-mentioned disadvantage, also require a considerable amount of energy for their operation and as a result the operator becomes fatigued quite rapidly.

To overcome the above-noted disadvantages of known machines of this type the clutch and brake in its present arrangement are designed to operate entirely independent of one another so that the failure of operation of one will not effect the operation of the other, and they are adapted to be operated by a fluid medium the supply of which is manually controlled and requires only a small amount of exertion on the part of the operator for starting the machine. It will be appreciated that such a control system will be much safer than one in which the operation of the brake and clutch are dependent upon one another, and due to the fact that it requires little, or no, exertion on the part of the operator the efficiency of the operator is not reduced due to fatigue, and his safety is further enhanced by his remaining alert, even though perfect safety is practically assured by having both hands occupied with the control levers during the cutting stroke.

Referring now to Figs. 2 and 5, and 6, the clutch designed for use with the present safety control system will be described in detail. The clutch, generally indicated at 14, may be of the known cone friction type including a female cone 25 fastened to the power shaft 9 to be constantly rotated thereby, and a male cone 26 adapted to be moved into and out of frictional driving engagement with said female cone. The male cone 26 will be mounted on the driven shaft 13 so that it can be moved axially thereof into and out of engagement with said female cone and will be drivingly connected to the shaft 13, as by a key connection 27, so that the shaft 13 will be driven through the clutch and the power shaft 9 when the male and female cone members are moved into engagement. As is usually the case with cone clutches of this type, the male cone 26 is shifted into and out of engagement with the female cone 25 by a rocker arm 28 the fingers 29 of which engage in a circumferential groove 30 in the shifting collar 31 connected to the male cone member.

Cone friction clutches of the type described are well known in the art, but in order to work in combination with the present control system the following structure is provided to render said clutch capable of being engaged by a fluid medium, such as air, and at the same time have it normally disengaged by a gravity actuated means. Referring particularly to Figs. 5 and 6 the rocker arm 28 is pinned to a shaft 32 rotatably mounted in spaced bearings 33 integral with the bracket 34 fastened to the machine frame. One end of a link 35 is pinned to the shaft 32, and the other end of the link 35 extends through an elongated slot 36 in a weight 37, which weight in falling will rotate the shaft 32 in a direction to disengage the clutch through the rocker arm 28. The end of the link 35 is prevented from being accidentally removed from the weight 37 by having a rod 38 extending transversely thereof passing through aligned slots 39 in the sides of the weight 37. While the weight 37 can be made heavy enough itself to normally disengage the clutch when falling, it has been found better not to make this part too cumbersome. The weight 37 is therefore shown augmented by a second weight 40 supported on a rod 41 fastened in the top of weight 37. The rising and falling movement of the two weights is guided by a guide member 42 surrounding the rod 41 and integral with a standard 43 fixed to the machine frame.

For raising the combined weights 37 and 40, and for engaging the clutch 14, the following mechanism is provided. The bottom of weight 37 is provided with two spaced depending arms 44 between which one end of a crank 45 extends and is held by a pin 46 passing through aligned apertures in the arms 44 and the end of the crank. The other end of crank 45 is pinned to a rock shaft 47 rotatably supported in bearings 48 integral with a standard 43 fixed to the machine frame, and also to which rock shaft 47 is pinned one end of a crank 50. The other end of crank 50 is pivoted to one end of the piston rod 51 of a single acting fluid cylinder 52, said cylinder having a single part 53 in the end through which the piston rod extends and to which a branch of the pipe line for conducting the operating fluid medium can be attached. When a fluid medium under pressure is admitted to the cylinder 52 the piston rod 51 moves to the right, looking at Fig. 5, and in so moving acts through the cranks 45 and 50 to raise the weights 37 and 40 whereupon the clutch is engaged. The clutch will remain in engagement so long as the fluid supply to cylinder 52 is maintained, but as soon as the fluid supply of the cylinder is cut off the weights 37 and 40 will act to disengage the clutch, and through the cranks 45 and 50 will move the piston rod 51 in a direction to exhaust the cylinder back into the supply line. It will be noticed by referring to Fig. 5 that the slot 36 in the weight 37 is made longer than the width of the link 35 so that there is a certain amount of lost motion between the weight and the link. By reason of this arrangement the weight in being raised by the piston has to move a certain amount before it transmits motion to the link 35 for disengaging the clutch and this lost motion insures against disengagement of the clutch until the cylinder is being properly, and intentionally, supplied with the fluid medium. Further, this lost motion arrangement allows the weights a chance to gain momentum in falling before engaging the link 35 so that an impact is provided on the link 35 for positively releasing the clutch should it tend to stick in engaging position.

As shown in Figs. 2, 7, and 8 the brake, indicated generally at 55, may take the general form of a well-known gravity actuated friction brake. Such a brake may include a drum 56 fixed to the driven shaft 13 to rotate therewith, said drum having a friction material on its periphery adapted to be engaged by a friction block 57 on the inside face of brake bands 58 to stop the driven shaft. The brake bands 58 are each pivoted at their lower ends to a pin 59 extending between two arms 60 of a bracket 61 fixed to the machine frame, and each include at their other end an upstanding projection 62. The brake bands are normally pivoted toward one another, for applying the brake, by a gravity actuated means acting through links 63 pivoted at one end to the projections 62 on the bands. This gravity actuated means may comprise a weight 64 having threaded adjusting rods 65 extending through either side thereof and on each of which is mounted a sliding support 66 on the top of which the weight 64 is supported and to the bottom of each of which is pivoted one of the links 63. Inasmuch as the weight 64, the rods 65, and the sliding supports 66 are supported only by the links 63, and the links are at the angle shown, the combined weight of these members will normally act to force the spaced ends of the brake bands toward one another to apply the brake. By shifting the sliding supports 66 along their respective rods 65 the angle of the links 63 can be changed, whereby the force applied to the brake bands by the gravity actuated means can be effectively varied.

Obviously this type of brake will be released by raising the gravity actuated means whereupon the links 63 will tend to force the spaced ends of the brake bands apart. Ordinarily this gravity actuated means is raised, and the brake is released, by a mechanically operated arrangement of some sort, but in order to render this brake capable of being released by a fluid operating medium the following improvements have been made therein. Referring to Fig. 8, a C bracket 67 is bolted at one end 68 to the machine frame, and to the other end 69 of said bracket, which is horizontal, are pinned two vertical guiding posts 70 in spaced parallel relation. Rigidly attached to the upper end of the guiding posts 70 is a piston comprising a plate 71 fixed to the upper end of the posts and a block 72 connected to said plate by a bolt 73, which bolt in conjunction with a washer serves to position a sealing washer 75 on top of the block. The weight 64 is slidably mounted on the posts 70 and includes a recess 76 in which the piston is slidably received. The recess 76 has a bearing sleeve 77 swetted thereinto and adapted to engage the side walls of the block 72 and the washer 75 to give a fluid tight fit between the two. The recess in the weight is closed by a cover 74 fastened to the top of the weight by bolts 78, there being a suitable gasket 79 between the cover and the weight to make a fluid tight connection. The cover 77 is provided with a port 80 to which a branch of the fluid conducting pipe line is adapted to be connected for permitting the introduction of a fluid into the recess 76 in said weight 64.

By constructing the gravity actuating means of the brake in the manner described a fluid cylinder arrangement is provided, and one which works in reverse to the normal operation of such a cylinder, or one in which the piston is stationary and the cylinder moves when a fluid under pressure is introduced into the cylinder. Referring to Fig. 8 is will be understood that as air is admitted to the recess 76 in the weight 64 the weight, in the capacity of a fluid cylinder, will be raised inasmuch as the piston is rigidly fixed on the posts 70 against movement. Upon the introduction of air into the recess 76 the weight will rise until the bottom 81 on the recess 76 comes against the bottom of the plate 71 comprising one part of the stationary piston, and in this raised position of the weight the brake will be released. The brake will remain in a released condition so long as fluid pressure is maintained in the recess 76, but just as soon as the fluid is cut off, the mass of the weight 64 will cause said weight to fall and apply the brake and at the same time exhaust the air in the recess 76 back into the line. The lowermost position of the weight 64 will be determined by the engagement of the bottom of the bearing sleeve 77 with the top of the plate 71. It will be understood that in order to permit the weight 64 to repeatedly rise and fall the fluid conducting pipe adjacent the port 80 must include a flexible portion since it must move with the weight, and such a flexible portion is noted at 82 in Fig. 4. While the posts 70 are usually sufficiently strong to support and guide the weight 64, it is sometimes found advisable to place a guide 83 along one wall of the weight, which guide may be welded, or otherwise fastened, to the machine frame in a position to assist the posts 70 in guiding the weight in its vertical movement, see Fig. 8.

Referring now to Fig. 4 wherein a diagrammatic layout of the piping system for the operating fluid is shown, the operation of the present control system will be outlined. The most important parts of this control system, diagrammatically shown in this figure and referred to generally in the following description, are shown more completely in other figures of the drawings and will be described in detail later in this specification. For the purpose of explaining this piping system air will be referred to as the fluid operating medium, but it is to be understood that any suitable fluid under pressure could be used. Air under pressure from any suitable source, such as a compressor, not shown, is supplied to the system through the supply pipe 85, which pipe includes a reduction valve 86 and a main shut-off valve, not shown, for cutting off the entire system when the machine is not being used.

From the supply pipe 85 the air passes through the normally closed master air valve 87, when the same is open to start the machine, to the line 88 and to the cross T 89 from whence it passes into the three lines 90, 91, and 92. Air will pass through the line 91 to an air cylinder 93 the piston 94 of which is pivoted to an arm 95 to remove a lock bolt from the path of the bull gear as will be fully described hereinafter. When the knife is at the top of its stroke the line 92 will be closed by a normally closed cam operated valve 96 so that air will not pass from the cross T 89 in this direction.

From the line 90 the air must pass through two normally closed hand operated valves 97 and 98 connected in series to the line 99, to the line 100 including a check valve 101 which permits passage of air only in the direction indicated by the arrow, to the branch 102, and from there through the line 103 to the lines 104 and 105 connected to the brake and clutch fluid operating means. The valves 97 and 98, as clearly shown in Figs. 15 and 23 are as fully described hereinafter, are of a known type of three-way valve which are adapted to exhaust the line to the atmosphere when the valve is in a normally closed position. When the knife is at the top of its stroke the cam operated valve 96 will be closed so that air from line 100 will build up in branch 106.

A by-pass including a normally open cam operated valve 107 and a check valve 108 is inserted for connecting lines 100 and 99, and this by-pass is provided for exhausting the lines to the brake and clutch in the event one or both of the manually operated valves 97 and 98 is allowed to close before the knife reaches the bottom of its cutting stroke. The valve 107 is adapted to be engaged and opened by a cam 109 on the bull gear shaft 19, and the cam is adjusted on the shaft so that it engages and closes the valve just as the knife reaches the bottom of its cutting stroke. Up until the valve 107 is closed the air may pass around the by-pass including said valve, but since it goes right back in the line 99, so long as pressure is maintained on line 99, the air will pass through branch 102 to the clutch and brake fluid operating means. However, if either of the hand operated valves is released before the knife reaches the bottom of its cutting stroke the pressure will be cut off of line 99, and the line will be bled through the released valve which exhausts to the atmosphere in its closed position. If this happens, then the lines to the clutch and brake operating means can exhaust through the by-pass including valve 107 whereupon the clutch will immediately be disengaged by its gravity actuated means and the brake will simultaneously be applied by its gravity actuated means to stop the machine. Without the bypass it would be impossible to exhaust these lines because of the presence of the check valve 101 in line 100.

After the knife reaches the bottom of its cutting stroke there is no longer danger of the operator getting his hands under the same, and means are provided whereby after the knife reaches the bottom of the stroke the hands can be removed from the valves 97 and 98 and air will still be applied to the fluid operating means of the clutch and brake. This means comprises a cam 110 rotatable with a bull gear shaft 19 which is adapted to engage an open valve 96 at the instant the knife reaches the bottom of its stroke. This permits air to flow from the cross T 89 through lines 92 and 106 to the branch 102 and thence to the brake and clutch operating means through lines 103, 104, and 105. At the same time the valve 96 is opened valve 107 is closed by cam 109 so that the air cannot go through the by-pass; and check valve 101 prevents it from going back through line 100.

Air will be maintained on the lines to the clutch and brake operating means until the knife completes one cycle and again reaches the top of the stroke at which time a cam 111 on the bull gear 18 engages and moves the slide 118 to the right, looking at Fig. 4, to release the master air valve 87 and open the main exhaust valve 113, which is normally closed, permitting the air from the lines 106, 102, 103, 104, and 105 to exhaust through lines 114 and 115 to the atmosphere whereupon the brake is applied and the clutch released by their respective gravity actuated means. When the master air valve 87 is allowed to open at the completion of the knife cycle an exhaust port in said valve is opened allowing the air in lines 91 and 92 to exhaust through pipe 115 to the atmosphere. When the knife has completed its cycle the cams 109 and 110 on the bull gear shaft will disengage the valves 107 and 96, respectively, so that the system will be ready for the next cycle of operation. It will be noticed that line 105 to the fluid operating means for the brake includes a check valve 116 which is adapted to be the full size of the pipe and which is arranged so as to cause the air entering the brake operating means to pass through reduction valve 117. This arrangement is provided for the reason that it is desirable to apply the brake instantly while it can be released more or less gradually, and if the exhausting air had to pass through a reduction valve the exhausting of the line would not be instantaneous, but gradual.

In order to start the machine the control system is such that the master air valve 87 and both of the hand operated valves 97 and 98 must be opened at the same time. The master air valve 87 is adapted to be opened when the slide 118 is moved to the left, see Fig. 4, until a lug 119 on said slide engages and operates an operating arm 120 on said valve. During this movement of the slide a finger 121 thereon which engages an operating arm on, and opens, the exhaust valve 113 when the slide is moved to the right, is removed from said exhaust valve to allow the same to move to its normally closed condition. In order to insure simultaneous actuation of the master air valve and the hand operated valves 97 and 98 the slide 118 is adapted to be moved to its operative position by movement of the hand levers for operating valves 97 and 98, and while this arrangement is clearly shown in Figs. 15–18, and 23, and will be fully described hereinafter, the main parts making up the same are generally indicated in Fig. 4 as including two hand levers 122 for operating the valves 97 and 98, and a linkage including members 124, 125, 126, and 127 for transmitting movement of said hand levers to the slide member to move the same to the left.

Referring now to Figs. 15–18 and 23, the two hand controls for the hand operated valves 97 and 98, and the arrangement for operating the master air valve in conjunction therewith, will be fully described. The hand operated valves 97 and 98 may be of a well-known type of three-way action valve clearly shown in Figs. 15 and 23. Such a valve may comprise an internally threaded inlet coupling 130 to which line 92 may be connected, and a threaded outlet coupling 131 to which the line to the other valve may be connected. The inlet and outlet couplings are connected by a nipple 132 threaded at each end into the respective couplings, but the nipple includes a partition 133 which prevents air from passing directly therethrough. At one side of the partition 133 the nipple is provided with a plurality of circumferentially spaced radially extending ports 134 connecting the interior of the nipple with the outside thereof, and on the other side of the partition 133 the nipple is provided with a plurality of similar ports 135. A valve sleeve 136 is slidably mounted on the outside of the nipple 132 and includes an air passage 137 which is adapted to connect the ports 134 and 135 in communication when slid to the position shown in Fig. 23, and in which position the valve is open. When the valve sleeve 136 is slid to the lower position, see Fig. 16, the air passage 137 of the sleeve is removed from communication with ports 135 so that the valve is closed. When the valve sleeve is slid to its valve closing position the ports 135 connected to the outlet coupling 131 are opened to the atmosphere so that the line may bleed to the atmosphere. The valve sleeve includes two packings 138 held in place by a coil spring 139 under compression, and the sleeve is made up of two parts 128 and 129 in threaded engagement for assembly purposes. It is pointed out that the present invention is not limited in any way to the use of valves of the specific type described, but any valve which will cut off the supply of air and exhaust the line to the atmosphere when in a closed position, and open the line to the supply of air in the open position, could be used regardless of its specific construction.

The control for the master air valve 87 and manually operated valves 97 and 98 is mounted as a whole on a plate 140 which can be mounted on the frame at the front of the machine so as to be accessible to the operator, see Fig. 15. The two hand operated valves 97 and 98 will be separately mounted on the plate 140 in spaced relation so that both hands of the operator are required for their operation, and since the two valves are alike in their mounting and operation, only one of the same will be described in detail, the same reference characters being applied to the same parts of each valve in the drawings.

Referring now to Figs. 15–18 a pair of brackets 141 including spaced supporting surfaces 142 and 143 are bolted to the plate 140 in spaced relation so that the supporting surfaces 142 and 143 are in vertical relation. Each valve 97 and 98 is mounted between the supporting surfaces 142 and 143 and near the front end thereof with the inlet and outlet couplings 130 and 131, respectively, thereof resting against the inside faces of the supporting surfaces. An aperture 144 is provided in the supporting surfaces in alignment with said couplings so that inlet and outlet air lines can be removably attached to said couplings.

The valve sleeve 136 of each valve is moved between its open and closed positions by a hand lever 122 pivoted on a pin 147 extending between posts 148 on the supporting surface 143, and which hand lever includes a yoke end 149 from each arm 150 of which extends a pin 151 adapted to engage a circumferential groove 152 in the valve sleeve, see Figs. 15, 16, and 18. The ends of the arms 150 extend beyond the valve sleeve and are each provided with elongated slots 153 into which one end of the pin 154 connected to a weight 155 may extend so that the weight is supported by said arms. Referring to Figs. 16 and 18 it will be seen that the supporting surfaces 142 and 143 are each provided with openings through which the ends of the weight 155 may extend to permit the same to move freely up and down as the hand lever is pivoted. With this arrangement, when the hand levers 122 are depressed downwardly the valve sleeve 136 will be slid upward to open the valves 97 and 98. The instant one hand is removed from either one of the hand levers 122 the weight 155 associated therewith will fall and pivot said hand lever to a valve closing position.

For operating the master air valve 87 simultaneously with the hand operated valves 97 and 98 the following structure is provided. Referring to Figs. 15 and 17, a pin 156 is fastened at one end to the plate 140 and extends transversely from said plate. A crank arm 126 is rotatably mounted at one end to said pin 156 and is pivoted at the other end to a vertically movable member 125 which has a rod-like end 159 thereon guided by a perforated post 160 extending from a plate 161 and attached to the plate 140. Threaded into the member 125 is a bolt 162 having the head thereof spaced from the face of member 125 and having that portion of its shank between the member 125 and the head thereof left unthreaded. A connecting member, indicated generally at 124 and comprising two rod-like ends 164 connected by an enlarged bearing portion 165, is mounted on the smooth shank of the bolt 162 with its bearing portion 165 rotatably engaging said shank. The rod-like ends 164 of the connecting member are adapted to rest on supporting surfaces 166 formed on the inside arms 150 of each of the hand levers 122 so as to be raised and lowered by a pivoting movement of said levers. A coil spring 167 encircling the rod-like end 159 of the member 125, and located between the post 160 and the enlarged portion of the member 125, normally acts to move said member 125 downward whereby the ends 164 of the connecting member 124 are normally held against the supporting surfaces 166 on the hand levers 122.

From the above description it will be readily appreciated that when the hand levers are pivoted downwardly to open the valves 97 and 98 that the connecting member 124 will be moved upward. This upward movement of the connecting member will raise the member 125 against the action of the coil spring 167 to subsequently rotate the end of the crank arm 126 on the pin 156. Rotation of the end of the crank arm 126 engaging the pin 156 is adapted to actuate a linkage for opening the master air valve 87 as will be hereinafter fully described, and the linkage is so arranged that a given rotation of the crank 126 is required to open the master air valve. The connecting member 124 due to its particular connection acts in the manner of a whiffletree, so that if only one hand lever 122 is operated the connecting member 126 will pivot about the bolt 162 and will raise the member 125 only half the distance it would be moved if both handles were operated simultaneously. The linkage is arranged so that this halfway movement of the member 125 will not be sufficient to rotate the crank arm 126 by an amount necessary to open the master air valve so that this whiffletree arrangement provides a connection which necessitates the simultaneous opening of both valves 97 and 98 before the master air valve 87 can be opened.

Slidably supported by spaced bearings 168 and 169 mounted on the plate 140 is the reciprocal slide 118. This slide 118 carries a lug 119 which is adapted to engage and open a master air valve 87 when the slide is moved to the left to the position shown in Fig. 15, which air valve may be of any well-known type of normally closed valve adapted to be cam operated to an open position. The slide 118 also carries a finger 121 which is adapted, when the slide is in the position shown in Fig. 15, to engage and open the normally closed exhaust valve 113, and which is adapted when the slide is moved to the left, looking at Fig. 15, to open the master air valve 87, to release the exhaust valve to permit it to return to its normally closed position. As will be noticed by referring to Fig. 15 the lug 119 and the finger 121 are each mounted on the slide 118 so that they can be adjusted along the same to insure the valves being operated in a proper timed relation to each other and the hand operated valves 97 and 98.

So that the master air valve 87 will be operated in conjunction with the manually operated valves 97 and 98 means is provided whereby the slide 118 will be moved to the left, looking at Fig. 15, when the hand levers 122 are depressed to open valves 97 and 98. This means includes a crank arm 127 having one end rotatably mounted on pin 156 and pinned to the end of crank 126 rotatably mounted thereon so that the two cranks form in effect a bellcrank lever. The lower end 171 of the crank arm 127 has a bolt 172 threaded thereinto, and which bolt extends transversely through an elongated slot 173 at the end of the slide 118. This elongated slot is of such a length that there is never any positive connection between the bolt itself and the slide member by means of which connection the crank arm 127 itself would tend to move the slide member 118.

The operative connection between the crank arm 127 and the slide 118 takes the form of a non-repeat latch mechanism including a latch member 174 which is pivoted on the end of the bolt 172 extending to the inside of the slide, see Figs. 16 and 17, and which latch is adapted to engage a lug 175 on the slide for connecting the crank arm 127 to said slide. In Fig. 15 the parts are shown in the positions which they assume when the knife is at the top of its stroke and the machine is ready to be started. Now if the handles 122 are depressed together to open the valves 97 and 98 the crank arm 127 will be rotated to the left. Since the latch 174 movable with the crank arm 127 is in engagement with the lug 175 on the slide 118 the slide will be moved to the left to open the master air valve 87 and release the exhaust valve 113. In moving to its operative position, or to the left, the roller 176 on the end of the slide 118 will be moved into the path of the cam 111 on the bull gear 18, and this cam, after the knife has completed its cycle, will engage and force the slide 118 back to its inoperative position, or to the right looking at Fig. 15, whereby the master air valve will be allowed to close, the exhaust valve 113 will be opened. When the slide 118 is moved to its inoperative position by the cam 111, the two hand levers 122 will be returned to their inoperative positions in the event the operator has maintained them in a depressed position.

The latch 174 includes a depending projection 178 which is adapted to engage a stop pin 179 on the plate 140 when the slide 118 is moved to the left to its operative position, and this engagement causes the latch 174 to be pivoted to a position where it disengages the lug 175 on the slide. The latch will normally be held in this lug disengaging position by the counterweight 180 integral therewith so that although the slide, when it is forced to the right by the cam 111 on the bull gear 18, will engage and move the crank arm 127 to the right, and consequently force the hand levers 122 to their inoperative position, the crank arm 127 will not be automatically latched to the slide. In order to again latch the crank arm 127 to the slide 118 the hand levers 122 must be manually pushed to their full inoperative position, which movement will move the crank 127 and the latch 174 connected thereto to the right until the depending projection 178 engages the stop lug 170 on the plate 140 whereupon the effect of the counterweight 180 will be overcome and the latch will be pivoted into latching engagement with the lug 175 on the slide. This non-repeat latching arrangement adds one safety feature to the several possessed by the control inasmuch as it prevents a repeat operation of the machine until the manually operated valves 97 and 98 are both completely shut off.

Single stroke cutting machines of the type described usually include a lock bolt which is adapted to be moved into the path of a stop on the bull gear 18 when the knife has completed one cycle to prevent an accidental repeat of the machine, and which is adapted to be moved out of the path of such a stop when the hand controls are operated to start the machine. Such lock bolts are usually moved into the path of the stop on the bull gear by a cam on a moving part of the knife driving mechanism, and are adapted to be mechanically connected to the hand controlled mechanical starting means to be moved out of the path of the stop when such a starting means is actuated.

In the present invention where the machine is controlled by a fluid operating medium the lock bolt must be operated by a fluid medium also, and the structure for accomplishing this will now be described. Referring to Figs. 1, 2, 10, and 11 the lock bolt in the present machine comprises a rod 181 extending horizontally across the back of the machine and slidably mounted in spaced bearings 182 mounted on the machine frame. One end of the lock bolt is adapted to be moved into and out of the path of a stop lug 183 fastened to the inside face of the bull gear 18, while the other end of the rod includes a pin 184 which is engaged by a yoke ended lever 185 pinned to the rock shaft 186. The other end of the rock shaft 186 extends to the front of the machine and has pinned thereto one end of a lever 95 the other end of which is pivoted to the upper end of the piston 94 of an air cylinder 93 which is pivoted at 190 to a bracket 191 on the frame of the machine. Line 91 of the piping system, see Fig. 4, is adapted to enter the top of the cylinder at port 192 so that air entering the cylinder will force the piston downward causing the rock shaft 186 to be rotated in a direction to cause the yoke ended lever 185 to move the lock bolt out of the path of the stop lug 183 on the bull gear 18. Referring to Fig. 4 it will be noticed that air will be admitted to the cylinder 93 the instant the master air valve is opened so that the lock bolt will be automatically retracted from the path of the stop lug on the bull gear when the machine is started. When the machine comes to rest in the proper manner without the use of the lock bolt the stop lug 183 is slightly spaced from the lock bolt 181, for the reason that when air is admitted to the lines 91 and 99 upon opening of the master air valve 87 and the hand valves 97 and 98 the clutch may be engaged and the machine started slightly before the lock bolt is withdrawn; and this leeway between the lock bolt and stop lug will take care of such a slight difference in the operation of the two air cylinders 52 and 93, the former for engaging the clutch and the latter for withdrawing the lock bolt.

For automatically moving the lock bolt 181 back into the path of the stop lug 183 on the bull gear 18 when the machine has completed one cycle and the knife has returned to the top of its stroke the following structure is provided. Keyed to the front end of the rock shaft 186 is an arm 193 having an enclosed spring pressed plunger, generally indicated at 194, mounted on one end. When the machine is at rest and the lock bolt is in its stop position, as shown in the drawings, the arm 193 is moved to the position shown where the plunger is retracted from the path of a cam 195 on the periphery of the crank 196 on which the crank pin 21 is carried, and which crank is driven by the bull gear shaft 19. However, when the machine is started, and air is admitted to the lock bolt cylinder 93 to rock the rock shaft 186 and withdraw the lock bolt 181, the rocking of the rock shaft will move the arm 193 to the right, looking at Fig. 11, to place the plunger in the path of the cam 195. Now as the knife completes one cycle the cam 195 will engage and knock the arm 193 to the left rocking the rock shaft 186 in a direction to insert the lock bolt into the path of the stop on the bull gear. This rotation of the rock shaft will move the piston 94 upwardly to exhaust the cylinder back into the line 91, which at this time is capable of being exhausted through the master air valve 87 which has been closed. Afted the cam 195 engages the plunger 194 there will be a slight overtravel of the crank carrying the cam so that when the plunger is returned into the path of the cam it will come to the right side thereof so far as direction of rotation of the crank is concerned. The cam 195 may be wedge-shaped, as shown, to insure the plunger returning to the proper side thereof when the machine is started. The plunger is preferably of a well-known spring pressed type so that the encased spring, not shown, will absorb and cushion the impact of the cam on the plunger at the completion of each cycle of the machine.

Referring now to the drawings and particularly Fig. 4 the complete operation of the safety control constituting a part of the present invention will be outlined. Assuming that the machine is at rest with the knife at the top of its stroke the parts will be in the position shown in the drawings and the clutch will be disengaged, the brake applied, and the master air valve 87 and the hand operated valves 97 and 98 will be closed, the main exhaust valve 113 will be opened, the cam operated valve 96 will be closed, the cam operated valve 107 will be opened, and the lock bolt 181 will be inserted into the path of the stop on the bull gear. Now to start the machine the two hand levers 122 must be first raised to their full inoperative position in order to latch the crank arm 127 to the slide 118 after which the levers are simultaneously depressed to open valves 97 and 98. This movement of the levers 122 causes the slide 118 to be moved to the left for opening the master air valve 87 and allowing the exhaust valve 113 to close, and air is admitted to the clutch and brake fluid operating means to engage the clutch and release the brake. At the same time air is introduced through line 91 to the lock bolt cylinder 93 for withdrawing the lock bolt.

If either hand lever 122 is released before the knife reaches the bottom of its stroke the lines to the clutch and brake will exhaust to the atmosphere and the clutch will be disengaged and the brake applied by their respective gravity actuated means. After the knife reaches the bottom of its downward stroke the valves 96 and 107 will be opened and closed respectively by cams on the bull gear shaft so that the hands can be removed from the levers 122 and the machine will continue to operate. When the knife completes one cycle, and reaches the top of its stroke, the slide 118 will be kicked to the right by the cam 111 on the bull gear whereupon the master air valve 87 will be allowed to close and the main exhaust valve 113 will be opened to exhaust the lines to the fluid operating means of the brake and clutch. At the time the knife reaches the top of its stroke the plunger 194 will be kicked to the left by the cam 195 to insert the lock bolt into the path of the stop lug on the bull gear 18.

As those skilled in the art know, cutting machines of this type are usually provided with a reciprocal clamp for holding the stack of sheet material on the table in cutting position relative to the knife. Such clamps serve two purposes. First, they are used to lightly clamp the stack of material during the time it is being located in proper cutting relation to the knife against the back gauge of the machine, and secondly, and probably most important, they act to tightly clamp the stack of material during the cutting stroke of the knife to prevent shifting of the stack and to insure a square and accurate cut of all the sheets in the stack. When the clamp is brought into light clamping position it is desirable to be able to "inch" it into position in a smooth manner so that it will not disturb the stack after it is properly positioned against the back gauge of the machine, and so that the stack may be shifted if desired during the movement of the clamp into its light clamping position. On the other hand, when the stack is in position to be cut it is desired that a heavy pressure be applied by the clamp during the cutting stroke of the knife, and the application of this heavy pressure must be applied smooth enough to prevent the shifting of the stack from its adjusted position and should be effected automatically prior to the actual cutting operation of the knife so as to leave the operator's hands free to manipulate the two-handed safety control. The hereinafter described fluid operated clamp, constituting a part of the present invention, overcomes all of the disadvantages of known clamp arrangements operated by a mechanical means, and the advantages thereof will be obvious to those skilled in the art.

Referring now to Figs. 1, 2, and 9 the clamp supporting and moving means will be described, and inasmuch as the clamp will be supported at both sides in the same manner, the supporting structure for only one side of the clamp is shown and will be described. The side frames 3, 3 of the machine may be provided with a channel 210 extending longitudinally thereof, and in which is supported at both ends a guide rod 211 along which the clamp is adapted to slide. Each of these guide rods may be supported adjacent its opposite end by any suitable means such as web 212 so that said rods will be spaced from the side frames. The clamp 5 has attached at each upper corner a perforated bracket 209 adapted to slidably engage the rods 212, and the clamp is normally moved to its raised position by a coil spring 213 surrounding each guide rod 212 and held in a compressed condition between the bracket 209 and a threaded collar 214 on the lower end of the rod. The force of the spring 213 can be adjusted by moving the threaded collar 214 to and from the bracket 209 to increase or decrease the compression of the spring, and such an adjustment of the collar can be accomplished by applying a wrench to the square end 215 of the rod, it being understood that the collar in this case should be held against rotation.

Bolted at 216 to each lower corner of the clamp 5 is a strap 217 which strap moves up and down with the clamp 5 and has a pin 218 extending transversely of the lower end thereof, see Figs. 2 and 9. The downward pressure on each strap 217 to lower the clamp against the action of the coil springs is applied to the straps through arms 219 having yoke ends 220 overhanging the pin 218 on the strap, said arms 219 being pivoted at 221 to a lever 222 keyed to the end of the rock shaft 223 extending across the back of the machine.

The rock shaft 223 when rotated in the direction indicated by the arrow in Fig. 9 will cause a downward pull on the straps 217 to lower the clamp, and it is this force that is applied by the fluid operating means in accordance with the present invention. Rotation of the rock shaft 223 in the direction of the arrow in Fig. 9 is accomplished through the piston 224 of a well-known type of fluid operated cylinder 225 pivoted at one end to a pin 226 extending between two spaced crank members 227 keyed to the rock shaft 223. Referring to Fig. 2 the force of the piston 224 is shown transmitted through two crank members 227 spaced on opposite sides of a bearing 228 for the rock shaft 223 in order to obtain an equal turning action on each end of the shaft and to eliminate tension in said shaft. Fluid under pressure is adapted to be admitted to the lower end of the cylinder 225 at 229 so that the fluid pressure when admitted thereto will always tend to move the piston in a direction to lower the clamp. When the supply of fluid is cut off from the cylinder the fluid will be exhausted therefrom back into the line when the piston 224 is returned to its original position under the action of the springs normally tending to raise the knife along with the weight of the piston and the other parts tending to rotate the shaft counterclockwise.

Referring to Fig. 9 it will be noted that a wing 230 on the bottom of the cylinder 225 is pivoted at 231 to a wing 232 on the machine frame, and the purpose of pivoting the fluid cylinder is to permit the piston to adjust itself angularly to account for the arcuate movement of the crank to which it is pivoted. To permit of this pivoted movement of the cylinder 225 the branch of the fluid supply line connected to said cylinder must have a flexible portion as indicated at 233 in Fig. 3.

In order to obtain a light holding pressure on the clamp 5 during the adjustment of the stack of material on the table and to subsequently and automatically obtain a heavy pressure on the clamp during the cutting stroke of the knife the piping arrangement shown diagrammatically in Fig. 3 may be made use of. Hereinafter for the purpose of describing this clamping arrangement air will be referred to as the fluid operating medium, but it is to be understood that any suitable fluid medium could be used as well as air.

Referring now to Fig. 3, a pipe 234 is connected to a suitable source of low pressure air, not shown, from whence the air flows in the direction indicated by the arrow, and this pipe includes a pressure reducing valve for controlling the pressure in this line. From pipe 234 the air flows through the treadle operated valve 235, the operation of which will be fully described hereinafter, through the pipe 236 and cross T 237 to the pipe 238 including the flexible portion 233 and to the cylinder 225. The air entering the cylinder from the pipe 234 moves the piston upward to apply the desired light holding pressure to the clamp, and piston is maintained under this pressure due to the check valve in the pipe 236 which prevents the air from flowing back in the direction indicated by the arrow.

For applying the heavy clamping pressure to the clamp automatically during the cutting stroke of the knife the following piping arrangement and operating means is provided. Referring again to Fig. 3, the pipe line 240 is connected to a suitable source of air under high pressure, or under greater pressure than that coming in pipe 234, not shown, from whence it passes in the direction indicated by the arrow through a reduction valve, a pressure gauge 241, up to a valve 242 which is normally open and which connects the supply of high pressure air with the cross T 237 and pipe 238. So that the valve 242 will be automatically closed to cut off air under pressure from the clamp during the latter part of the upward stroke of the knife and during the time the knife is at the top of its stroke the operating arm 243 thereof is adapted to be engaged and operated by a cam 244 on the bull gear shaft 19.

Referring to Fig. 9, it will be noticed that the cam 244 is shaped so as to close the valve 242, and maintain the same closed during a given portion of the cycle of the knife, which during the remaining portion of the knife cycle, the valve 242 is allowed to open and remain open. The cam 244 is adapted to be adjusted circumferentially of the bull gear shaft 19 so that it can be made to close the valve 242 at any desired time during the operating cycle of the machine. It has been found most desirable to adjust this cam 244 about the bull gear shaft so that the valve 242 will be opened, and consequently air under high pressure will be admitted to the cylinder 225, as the knife starts its downward stroke, or just prior to the time the knife reaches the stack of material to be cut, so that the stack of material will be firmly clamped on the table 2 during the actual cutting operation. This valve must remain open until the knife has completed its cutting stroke after which it may be allowed to close since the high pressure air will be trapped in the cylinder 224 to hold the clamp in its firm holding condition. However, it has been found desirable to have this valve open until the knife practically reaches the top of its stroke at which time the cam 244 engages arm 243 and closes the valve 292 and maintains it closed until the knife again starts its downward stroke.

After the valve 242 is closed, the high pressure air will be maintained in the cylinder 225, and the clamp will be held in its firm clamping position until the normally closed exhaust valve 245 and the pipe 246 connected to the T union 237 is opened to exhaust the lines including pipe 238, 236 above the check valve, and the line to valve 242 from the cross T 237. The operating lever 248 of the exhaust valve 245 should be located on the machine in a position to be readily accessible to the operator, and it has been found desirable to place it so that the operator can release the exhaust valve with his knee to leave his hands free for other work. Ordinarily the pressure will not be released from the air cylinder 225 until the knife has reached the top of the stroke where it is automatically stopped by the means heretofore fully described, and at this time the hands can be safely placed under the knife to grab the stack of material before air pressure on the clamp is released.

Referring now to Figs. 12, 13, and 14 the treadle operated valve and the treadle for operating the same will be described. The treadle operated valve, indicated generally at 235, may be of the rotary type comprising a journal portion 251 bolted to the lower part of the machine frame at the front of the machine so as to be accessible for operation by the foot. The journal portion 251 includes circumferentially spaced inlet and outlet ports 252 and 253, respectively, extending radially into the journal housing and including internally threaded couplings 254 and 255, respectively, to which pipe lines may be connected. The inlet and outlet ports include longitudinally extending passages 256 and 257, respectively, which open into the vertical face of the journal portion 251. The inlet and outlet ports are placed in communication, or the valve is opened, when the circular valve operating member 258, rotatably mounted relative to the journal portion 251, is rotated to a point where the arcuate passage 259 riding on the vertical face of the journal portion places the passages 256 and 257 in communication. When the member 258 is returned to the position shown in Fig. 14 it will be noticed that the passage 259 does not place the passages 256 and 257 in communication hence the valve is closed. This is the normal position of the valve and the means for returning the valve to this position operates on the treadle as will be fully described hereinafter. The circular valve operating member 258 is normally forced into face to face contact with the journal portion 251 by a coil spring 260, and as will be readily understood, the engaging faces of the two are suitably fitted together to prevent the leakage of air therebetween. This particular rotary type valve is well known in the art and is shown and described as one particular type of valve that is suitable for the present fluid operated clamp control system. However, it is pointed out that there are many other suitable types of valves which could be used in place of this rotary type valve so that the invention is not limited to the use of such a valve.

Coming now to the treadle arrangement for operating this valve with the foot it will be noticed that the circular valve operating member 258 is keyed at 261 to a shaft 262 rotatably mounted at one end in the journal portion 251 of the valve and at the other end in a bearing 263 bolted to the machine frame. This shaft 262 is adapted to be rocked by the elongated treadle 264 pinned thereto at 265 and 266, and the treadle is connected to the shaft 262 so that when it is in its horizontal position the shaft will be rocked to a position to close the valve 250, see Fig. 14.

For normally moving the treadle 264 to a valve closing position, and for opposing oscillation of the treadle so that a smooth regulated control of the valve by foot pressure can be accomplished, the following structure is provided. Bolted to the machine frame on either side of the shaft 262, and spaced from one another, are two pairs of supporting brackets 267 in which opposite ends of rod 268 are supported and pinned, see Fig. 13. Slidably mounted on each of the rods 268 is a circular member 269 having a circumferential groove 270 therein. The treadle is provided with four vertically depending webs 271 arranged in pairs lengthwise of the treadle, and each of these webs includes, at its bottom end, a transversely extending member 272 which is adapted to extend into the groove 270 on one of said members 269. By reason of this arrangement it will be noticed that an oscillation of the treadle 264 will cause a sliding movement of the member 269 along the rod 268 on which it is mounted. A coil spring 273 encircles the rod 268 on either side of the circular member 269, and each of these springs is held under equal compression between the bracket 267 and the opposite ends of the circular member 263 so that they tend to move said member to the mid-point of the rod. Therefore, since the treadle is operatively connected to the circular member 269 movement of the latter to the mid-point of the rod by the coil spring will bring the treadle to its horizontal position and in which position the rotary valve 250 is closed. These coil springs 273 also resist movement of the treadle under foot pressure, and such resistance makes it possible for one to obtain a smooth control of the valve 250 through foot pressure so that the clamp 5 can be literally "inched" into its light holding position by the foot.

Cutting machines of the type described include back gauges on the table against which the stack of material to be cut can be jammed to square the stack and locate it in cutting position relative to the knife. These back gauges are slidably mounted on the table to move relative to the cutting line of the knife for accommodating sheets of different sizes, and are usually adjusted along the table relative to the cutting line of the knife by manually operated screws. In known machines there is generally no provision for clamping the back gauge in adjusted position, but threaded engagement between the adjusting screw and the back gauge is relied upon to hold the back gauge in adjusted position when the screw is locked. It has been found that, due to the slight lost motion between the adjusting screw and the back gauge, when the stack of material is jammed against the back gauge said gauge is very often moved from the desired adjusted position. While this movement may be very slight, depending, of course, upon the fit of the threaded engagement between the adjusting screw and the back gauge, it has been found to be sufficient, in some cases, to spoil the desired cut sheet size.

To overcome this disadvantage means have been provided on the present machine for clamping the back gauge in adjusted position on the cutting table of the machine, and this means has been designed so as to be operated by a fluid medium to give a quick and positive action without fatiguing the operator. Two embodiments of suitable fluid operated back gauge clamping means are shown in the drawings, one being shown in Figs. 19 and 20, and the other being shown in Figs. 21 and 22, and both will now be described.

Referring first to Figs. 19 and 20 one, and the preferred, embodiment of the back gauge clamping arrangement will be described. As is usually the case the back gauge 275 is slidably held onto the table 2 by sliding gibs 276 fastened thereto which slide in undercut guide slots 277 extending lengthwise of the table. The back gauge is adapted to be adjusted lengthwise of the table relative to the cutting line of the knife by the back gauge screw 278 extending lengthwise of the table and engaging a nut 279 connected to the back gauge. The screw 278 extends to the front of the machine where it is provided with a hand wheel 280, and passes through a threaded pinch boss 281 which can be clamped to lock the screw in an adjusted position by operating the handle 282. Heretofore, it was the clamping of the screw 278 by the pinch boss 281 that was relied upon to lock the back gauge in a desired position of adjustment. The present fluid operated back gauge clamping means is adapted to supplement the locking of the back gauge screw, and is arranged to be operated by the pinch boss handle 282 so that no extra operation is required of the operator for inducing this added clamping of the back gauge.

Pivoted on each of a pair of spaced brackets 283 on the back gauge 275 is a bellcrank 284. Between the vertically extending arms 285 of the bellcranks 284 is located a Sylphon 286, or other suitable fluid operated actuating member, e. g. a fluid cylinder, the arms 287 of which are pivoted at 288 to the ends of the arms 285 of the bellcrank 284. The other arms 289 of each of the bellcranks are pivoted to a friction pad 290 which is adapted to extend through an opening 291 in the back gauge to engage the top of the table 2. The fluid medium, in this instance air under pressure, is introduced into the Sylphon 286 through conduit 292, which conduit includes a valve 293 for cutting the conduit from the air supply line 294 and for exhausting the conduit 292 to the atmosphere. The valve 293 is adapted to be operated by a link 295 connected to the handle 282 of the pinch boss 281 so that when the handle is operated to clamp the pinch boss the valve 293 will be opened, and when the handle 282 is turned to release the pinch boss for screw adjustment the valve will cut off the supply line and exhaust the conduit 292 to the atmosphere. The arms 285 of the bellcranks 284 are connected by a return spring 296 which normally tends to release the friction pads 299 from clamping engagement with the table when the air is cut off from the Sylphon, and serves to compress the Sylphon for exhausting the air from the same. To permit movement of the back gauge 275 along the table the conduit 292 may include a flexible hose portion 297.

The embodiment of the fluid operating clamping means for the back gauge 275 shown in Figs. 21 and 22 differs from the one described above only in the particular structure used for applying pressure to the friction pad, and the corresponding parts of the two will be designated by the same reference characters. In this embodiment, instead of one Sylphon applying pressure to two friction pads through a bellcrank linkage, two separate encased Sylphons 298 are provided. In this instance the friction pads 299 are connected to the Sylphons to slide in the case 300 therefor in the manner of a piston, see Fig. 22, and each friction pad extends through an opening in the back gauge to engage the top of the table 2. In order to supply air to the two separate Sylphons 298 the conduit 292 may be provided with a Y union 301 from which flexible hoses 302 extend to the Sylphons. It will be appreciated that this latter embodiment will operate in the same manner as the preferred embodiment above described so that its operation need not be set forth separately.

It will be readily understood by those skilled in the art that the improvements in cutting machines of a known type and constituting the present invention render such a machine easier and safer to operate as well as enhancing the efficiency of such machines. By adapting certain parts of the machine for operation by a fluid medium, which parts were heretofore generally operated by manually operated mechanical means, the operator's job has been made easier as the result of which his efficiency does not decrease so rapidly as the day progresses due to physical fatigue. In addition, the fluid operated control system lends itself very readily to a two-handed safety control which is novel and which possesses advantages over similar controls known in the prior art.

The described fluid operated clamp has many advantages not shown by similar clamps which are mechanically operated in the prior art. To enumerate only a few of these advantages we might point out first that with such an arrangement the clamp can be moved to a light holding position atop a stack of material smoothly and easily. In fact, it has been found that the clamp can be "inched" to a holding position so smoothly and accurately that it can be brought down upon a single sheet of paper placed edgewise on the table to hold the same without bending the sheet laterally to any appreciable extent. Secondly, the particular way in which the fluid operating means for the clamp is combined with a knife driving mechanism makes it possible to apply a heavy holding pressure to the clamp automatically and smoothly at any time during the cutting stroke of the knife, said heavy pressure augmenting the light pressure in such a way that there is no sudden movement of the clamp toward the stack of sheet material, which sudden movement might cause the stack to shift laterally. Another advantage of a fluid operated clamp of the type described is found in the fact that its operation requires no exertion, or unbalancing, on the part of the operator as is true of known mechanically operated clamps. With the present clamping arrangement the clamp is smoothly and effectively moved to a clamping position by a means independent of the knife driving mechanism and the stack of material to be cut is adapted to be firmly clamped before the knife actually engages the same. This is a decided advantage over known clamping arrangements which are mechanically operated from the knife driving mechanism because in such clamping arrangements the stack of material is generally never fully clamped before the knife engages it with the result that the knife must act as a clamp to move the sheets into firm engagement before the cutting action really starts; and this has been found to cause a rapid dulling of the knife and a laterally shifting of the stack of sheets to be cut.

Although we have shown and described certain specific embodiments of our invention, we are fully aware that many modifications thereof are possible. Our invention therefore, is not to be restricted except insofar as necessitated by the prior art and by the spirit of the appended claims.

Having thus described our invention what we claim is new and desire to secure by Letters Patent of the United States is:

1. In a cutting machine the combination of a table, a reciprocal working element movable to and from an operative position relative to said table, a driven mechanism for reciprocating said working element and including a bull gear shaft, a driving mechanism, a fluid operated clutch for connecting the driven and driving mechanisms, means normally acting to disengage said clutch, a fluid operated brake independent of said clutch for stopping the driven mechanism, means normally acting to apply said brake, a pipe line for conducting a fluid under pressure and connected to said clutch and brake, a plurality of manually operated valves in said pipe line requiring simultaneous actuation for admitting fluid under pressure to said clutch and brake, a fluid operated clamp movable to and from clamping position relative to said table and for holding material thereon to be operated on, means normally moving said clamp to its inoperative position, a conduit for introducing low pressure fluid to said clamp, a second conduit for introducing high pressure fluid to said clamp, a normally closed valve in each of said conduits, and a cam rotatable with said bull gear shaft and adapted to engage and open the valve in said second conduit at an interval during the downward stroke of said working element, whereby said clamp is adapted to apply a heavy pressure to the material on said table during the operating stroke of the working element.

2. In a cutting machine the combination of a table, a reciprocal working element movable to and from an operative position relative to said table, a driven mechanism for reciprocating said working element, a driving mechanism, a fluid operated clutch for connecting the driven and driving mechanisms, means normally acting to disengage said clutch, a fluid operated brake independent of said clutch for stopping the driven mechanism, means normally acting to apply said brake, a pipe line for conducting a fluid under pressure and connected to said clutch and brake, a plurality of manually operated valves in said pipe line requiring simultaneous actuation for admitting fluid under pressure to said clutch and brake, a fluid operated clamp movable to and from clamping position relative to said table and for holding material thereon to be operated on, means normally moving said clamp to its inoperative position, a conduit for introducing low pressure fluid to said clamp, a second conduit for introducing high pressure fluid to said clamp, a normally closed valve in each of said conduits, and a cam moved by and in conjunction with said driven mechanism and adapted to engage and open the valve in said second conduit at an interval during the downward stroke of said knife, whereby said clamp is adapted to apply a heavy pressure to the material on said table during the operating stroke of the working element.

3. In a cutting machine the combination of a table, a reciprocal working element movable to and from an operative position relative to said table, a driven mechanism for reciprocating said working element and including a bull gear shaft, a driving mechanism, a fluid operated clutch for connecting the driven and driving mechanisms, gravity actuated means normally acting to disengage said clutch, a fluid operated brake independent of said clutch for stopping the driven mechanism, gravity actuated means normally acting to apply said brake, a pipe line for conducting a fluid under pressure and connected to said clutch and brake, a plurality of valves in said pipe line requiring simultaneous actuation for admitting fluid under pressure to said clutch and brake, manually operated means for actuating said plurality of valves simultaneously and requiring the simultaneous use of two hands for its operation, a fluid operated clamp movable to and from clamping position relative to said table and for holding material thereon to be operated on, means normally moving said clamp to its inoperative position, a conduit for introducing low pressure fluid to said clamp, a second conduit for introducing high pressure fluid to said clamp, a normally closed valve in each of said conduits, and a cam rotatable with said bull gear shaft and adapted to engage and open the valve in said second conduit at an interval during the downward stroke of said working element, whereby said clamp is adapted to apply a heavy pressure to the material on said table during the operating stroke of the working element.

4. In a cutting machine the combination of a table, a reciprocal working element movable to and from an operative position relative to said table, a driven mechanism for reciprocating said working element and including a bull gear shaft, a driving mechanism, a fluid operated clutch for connecting the driven and driving mechanisms, means normally acting to disengage said clutch, a fluid operated brake independent of said clutch for stopping the driven mechanism, means normally acting to apply said brake, a pipe line for conducting a fluid under pressure and connected to said clutch and brake, a pair of manually operated valves in series in said pipe line and spaced from one another, a manual control for operating each of said valves, a main valve in said pipe line in series with said pair of valves and in advance thereof, a slide member adapted to operate said main valve, means for operating said slide member to open said main valve, said means connected to said manual controls to be operated in conjunction therewith and requiring the simultaneous operation of both of said manual controls to move said slide member sufficiently to open said main valve, a fluid operated clamp movable to and from clamping position relative to said table and for holding material thereon to be operated on, means normally moving said clamp to its inoperative position, a conduit for introducing low pressure fluid to said clamp, a second conduit for introducing high pressure fluid to said clamp, a normally closed valve in each of said conduits, and a cam rotatable with said bull gear shaft and adapted to engage and open the valve in said second conduit at an interval during the downward stroke of said knife, whereby said clamp is adapted to apply a heavy pressure to the material on said table during the operating stroke of the working element.

5. In a cutting machine the combination of a table, a reciprocal working element movable to and from an operative position relative to said table, a driven mechanism for reciprocating said working element and including a bull gear shaft, a driving mechanism, a fluid operated clutch for connecting the driven and driving mechanisms, means normally acting to disengage said clutch, a fluid operated brake independent of said clutch for stopping the driven mechanism, means normally acting to apply said brake, a pipe line for conducting a fluid under pressure and connected to said clutch and brake, a pair of manually operated valves in series in said pipe line and spaced from one another, a manual control for operating each of said valves, a main valve in said pipe line in series with said pair of valves and in advance thereof, a slide member adapted to operate said main valve, means for operating said slide member to open said main valve, said means connected to said manual controls to be operated in conjunction therewith and requiring the simultaneous operation of both of said manual controls to move said slide member sufficiently to open said main valve, means operated by said driven mechanism adapted to engage and move said slide member to its valve closing position at the end of each cycle of said knife and to close said manually operated valves, and a latch mechanism associated with the connection between said slide member and said manual controls necessitating a closing of each of said manually operated valves at the end of each cycle of the knife before the main valve can again be opened to start a repeat cycle, a fluid operated clamp movable to and from clamping position relative to said table and for holding material thereon to be operated on, means normally moving said clamp to its inoperative position, a conduit for introducing low pressure fluid to said clamp, a second conduit for introducing high pressure fluid to said clamp, a normally closed valve in each of said conduits, and a cam rotatable with said bull gear shaft and adapted to engage and open the valve in said second conduit at an interval during the downward stroke of said working element, whereby said clamp is adapted to apply a heavy pressure to the material on said table during the cutting stroke of the working element.

6. In a cutting machine the combination of a table, a reciprocal working element movable to and from an operative position relative to said table, driving means for reciprocating said working element, a fluid operated clamp movable to and from clamping position relative to said table and for holding material to be operated on thereon, means normally moving said clamp to its inoperative position, means for introducing a fluid under light pressure to said clamp, means for introducing a fluid under high pressure to said clamp, and means connected with said driving mechanism for automatically actuating said last mentioned means at given intervals whereby a heavy pressure is adapted to be applied to said clamp during the downward stroke of said working element.

7. In a cutting machine the combination of a table, a reciprocal working element movable to and from an operative position relative to said table, driving means for reciprocating said working element, a fluid operated clamp movable to and from clamping position relative to said table and for holding material to be operated on thereon, means normally moving said clamp to its inoperative position, means for introducing a fluid under light pressure to said clamp, means independent of said first mentioned means for introducing a fluid under high pressure to said clamp, and means connected with said driving mechanism for automatically actuating said last mentioned means at given intervals whereby a heavy pressure is adapted to be applied to said clamp during the downward stroke of said working element.

8. In a cutting machine the combination of a table, a reciprocal working element movable to and from an operative position relative to said table, driving means for reciprocating said working element, a fluid operated clamp movable to and from clamping position relative to said table and for holding material to be operated on thereon, means normally moving said clamp to its inoperative position, manually operated means for introducing a fluid under light pressure to said clamp, means independent of said last mentioned means for introducing a fluid under high pressure to said clamp, and means connected with said driving mechanism for automatically actuating said last mentioned means at given intervals, whereby a heavy pressure is adapted to be applied to said clamp during the downward stroke of said working element.

9. In a cutting machine the combination of a table, a reciprocal working element movable to and from an operative position relative to said table, driving means for reciprocating said working element, a clamp movable to and from clamping position relative to said table, means normally moving said clamp to its inoperative position, a fluid pressure cylinder the piston of which is connected to said clamp to move the same to its operative position, means for introducing a fluid under low pressure to said cylinder, a second means independent of said first mentioned means for introducing a fluid under high pressure to said cylinder, means connected with said driving mechanism for automatically actuating said second means at given intervals whereby a heavy pressure is adapted to be applied to said clamp during the downward stroke of said working element, and manually operated means for exhausting said cylinder.

10. In a cutting machine the combination of a table, a reciprocal working element movable to and from an operative position relative to said table, driving means for reciprocating said working element, a clamp movable to and from clamping position relative to said table, means normally moving said clamp to its inoperative position, a double-ended pivoted lever having one end connected with said clamp, a fluid pressure cylinder the piston of which is connected to the other end of said double-ended lever to move the clamp to its operative position, a conduit for directing fluid under low pressure to said cylinder, a second conduit for directing fluid under high pressure to said cylinder, a normally closed valve in each of said conduits, manually operated means for opening the valve in said first conduit, means connected with said driving mechanism for automatically opening said other valve at an interval during the downward stroke of said working element, and means for exhausting said cylinder after said working element has reached the bottom of its downward stroke.

11. In a cutting machine the combination of a table, a reciprocal working element movable to and from an operative position relative to said table, driving means for said working element and including a bull gear shaft, a clamp movable to and from clamping position relative to said table, means normally moving said clamp to its inoperative position, a fluid pressure cylinder the piston of which is connected to said clamp to move the same to its operative position, a conduit for directing fluid under low pressure to said cylinder, a second conduit for directing fluid under high pressure to said cylinder, a normally closed valve in each of said conduits, manually operated means for opening the valve in said first conduit, a cam rotatable with said bull gear shaft and adapted to engage and open said other valve at an interval during the downward stroke of said working element, and means for exhausting said cylinder after said working element has reached the bottom of its downward stroke.

12. In a cutting machine the combination of a table, a reciprocal working element movable to and from an operative position relative to said table, driving means for said working element and including a bull gear shaft, a clamp movable to and from clamping position relative to said table, means normally moving said clamp to its inoperative position, a fluid pressure cylinder the piston of which is connected to said clamp to move the same to its operative position, a conduit for directing fluid under low pressure to said cylinder, a second conduit for directing fluid under high pressure to said cylinder, a normally closed valve in each of said conduits, manually operated means for opening the valve in said first conduit, a cam rotatable with said bull gear shaft and adapted to engage and open said other valve at an interval during the downward stroke of said working element, and means for adjusting said cam circumferentially of said bull gear shaft whereby the opening of the valve in the second conduit thereby can be adjusted to occur at any desired interval in the downward stroke of the working element.

13. In a cutting machine the combination of a table, a reciprocal working element movable to and from an operative position relative to said table, driving means for said working element and including a bull gear shaft, a clamp movable to and from clamping position relative to said table, means normally moving said clamp to its inoperative position, a fluid pressure cylinder the piston of which is connected to said clamp to move the same to its operative position, a conduit for directing fluid under low pressure to said cylinder, a second conduit for directing fluid under high pressure to said cylinder, a treadle operated valve in said first conduit, a treadle for operating said valve, resilient means normally acting on said treadle to move the same to a position where it closes said valve, a normally closed valve in said second conduit, a cam rotatable with said bull gear shaft and adapted to engage and open said last mentioned valve at an interval during the downward stroke of said working element, means for adjusting said cam circumferentially of said bull gear shaft whereby the opening of the valve in the second conduit thereby can be adjusted to occur at any desired interval in the downward stroke of the working element, and a manually operated exhaust valve for exhausting said cylinder after said working element has reached the bottom of its downward stroke.

14. In a cutting machine the combination of a table, a reciprocal working element movable to and from an operative position relative to said table, driving means for reciprocating said working element, a pneumatically operated clamp movable to and from clamping position relative to said table and for holding material thereon to be operated on, means normally moving said clamp to its inoperative position, means for introducing low pressure air to said clamp, means for introducing high pressure air to said clamp, and means connected with said driving mechanism for automatically actuating said last mentioned means at given intervals, whereby a heavy pressure is adapted to be applied by said clamp during the downward stroke of the working element.

15. In a cutting machine the combination of a table, a working element movable to and from an operative position relative to said table, a clamp movable to and from clamping position relative to said table and for holding material thereon to be operated on, means normally moving said clamp from clamping position relative to said table, a fluid operated cylinder the piston of which is connected to said clamp, said cylinder provided with a fluid inlet and a fluid exhaust located on the same side of the piston to provide a single acting piston, a normally closed valve in said exhaust, means for introducing low pressure fluid to said cylinder for moving said clamp to its clamping position with light pressure, means for introducing high pressure fluid to said cylinder for applying a heavy pressure to said clamp during the operating stroke of said working element, and means for opening said exhaust valve whereby the means normally moving said clamp from its clamping position acts to move said piston to its starting position.

16. In a cutting machine the combination of a table, a working element movable to and from an operative position relative to said table, a clamp movable to and from clamping position relative to said table and for holding material thereon to be operated on, means normally moving said clamp from clamping position relative to said table, a pneumatically operated cylinder the piston of which is connected to said clamp to move and be moved by the same, an opening in one end of said cylinder, a conduit connected to said opening, a normally closed exhaust valve in said conduit, means for introducing low pressure air into said conduit for moving said clamp to its clamping position with light pressure, means for introducing high pressure air to said conduit for applying a heavy pressure to said clamp during the operating stroke of said working element, and means for opening said exhaust valve for permitting said normally acting means to move said clamp from its clamping position and thereby return said piston to its starting position.

17. In a cutting machine the combination of a driving mechanism, a driven mechanism, a normally disengaged clutch for connecting the two together, fluid operated means for engaging said clutch, a normally actuated brake for stopping said driven mechanism, fluid operated means for releasing said brake, a pipe line for conducting a fluid under pressure and connected to both of said fluid operating means for engaging said clutch and disengaging said brake, a plurality of valves in said pipe line requiring simultaneous actuation for admitting fluid to said pipe line to start the machine, two of said valves normally biased to a closed position, a pair of remote manual controls for opening said two valves, and means actuated by operation of said manual controls for actuating the remaining valves in said pipe line, said means requiring the simultaneous operation of said two controls for an actuation of said remaining valves.

18. In a cutting machine the combination of a driving mechanism, a driven mechanism, a normally disengaged clutch for connecting the two together, fluid operated means for engaging said clutch, a normally actuated brake for stopping said driven mechanism, fluid operated means for releasing said brake, a pipe line for conducting a fluid under pressure and connected to both of said fluid operating means for engaging said clutch and disengaging said brake, three valves in said pipe line and requiring simultaneous actuation for admitting fluid to said pipe line to start the machine, two of said valves biased to a closed position, a pair of manual control members for operating said last mentioned two valves, and spaced from one another so as to require the use of both hands for operating the same, and means actuated by the operation of said control members for opening said third valve, and requiring the simultaneous actuation of said control members for effecting an opening of said third valve.

19. In a cutting machine the combination of a driving mechanism, a driven mechanism, a normally disengaged clutch for connecting the two together, fluid operated means for engaging said clutch, a normally actuated brake for stopping said driven mechanism, fluid operated means for releasing said brake, a pipe line for conducting a fluid under pressure and connected to both of said fluid operating means for engaging said clutch and disengaging said brake, three valves in said pipe line and requiring simultaneous actuation for admitting fluid to said pipe line to start the machine, two of said valves biased to a closed position, a pair of manual control members for operating said last mentioned two valves, and spaced from one another so as to require the use of both hands for operating the same, a reciprocal member adapted to engage and open said third valve when moved to its operative position, motion transmitting means connecting said control members and said reciprocal member whereby the latter is adapted to be moved to its operative position by operation of the former, said motion transmitting means being such that a simultaneous operation of said two control members is required for moving said reciprocal member to its operative position.

20. In a cutting machine the combination of a driving mechanism, a driven mechanism, a normally disengaged clutch for connecting the two together, fluid operated means for engaging said clutch, a normally actuated brake for stopping said driven mechanism, fluid operated means for releasing said brake, a pipe line for conducting a fluid under pressure and connected to both of said fluid operating means for engaging said clutch and disengaging said brake, three normally closed valves in said pipe line and requiring simultaneous actuation for admitting a fluid to said pipe line to start the machine, a pair of manual control members for operating two of said valves and spaced from one another so as to require the use of both hands for operating the same, a reciprocal member adapted to be moved to an operative position wherein it engages and opens said third valve, means associated with said driven mechanism adapted to engage and move said reciprocal member from its operative position at a given time in each cycle of the machine, and motion transmitting means adapted to connect said hand controls and said reciprocal member whereby said reciprocal member is adapted to be moved to its operative position by the simultaneous operation of said control members and said hand control members are adapted to be moved to their inoperative position by movement of said reciprocal member to its inoperative position, said motion transmitting means including a releasable latch mechanism adapted to positively engage and release said reciprocal member and arranged whereby a movement of both of said control members to their inoperative position is necessary at the end of each cycle of the machine before said motion transmitting means will again be positively connected to said reciprocal member.

21. In a cutting machine the combination of a driving mechanism, a driven mechanism, a normally disengaged clutch for connecting the two together, fluid operated means for engaging said clutch, a normally actuated brake for stopping said driven mechanism, fluid operated means for releasing said brake, a pipe line for conducting a fluid under pressure and connected to both of said fluid operating means for engaging said clutch and disengaging said brake, three normally closed valves in said pipe line and requiring simultaneous actuation for admitting a fluid to said pipe line to start the machine, a pair of manual control members for operating two of said valves and spaced from one another so as to require the use of both hands for operating the same, a reciprocal member adapted to be moved to an operative position wherein it engages and opens said third valve, means associated with said driven mechanism adapted to engage and move said reciprocal member from its operative position at a given time in each cycle of the machine for automatically stopping the machine, motion transmitting means adapted to connect said control members and said reciprocal member whereby said reciprocal member is adapted to be moved to its operative position by movement of said control members to their operative position, and said control members are adapted to be moved to their inoperative positions by movement of said reciprocal member to its inoperative position, said motion transmitting means including a whiffle tree connection between said two control members requiring a simultaneous operation of the two for transmitting the necessary movement to said reciprocal member to move it to its operative position.

22. In a cutting machine the combination of a driving mechanism, a driven mechanism, a normally disengaged clutch for connecting the two together, fluid operated means for engaging said clutch, a normally actuated brake for stopping said driven mechanism, fluid operated means for releasing said brake, a pipe line for conducting a fluid under pressure and connected to both of said fluid operating means for engaging said clutch and disengaging said brake, three normally closed valves in said pipe line and requiring simultaneous actuation for admitting a fluid to said pipe line to start the machine, a pair of manual control members for operating two of said valves and spaced from one another so as to require the use of both hands for operating the same, a reciprocal member adapted to be moved to an operative position wherein it engages and opens said third valve, means associated with said driven mechanism adapted to engage and move said reciprocal member from its operative position at a given time in each cycle of the machine for automatically stopping the machine, motion transmitting means adapted to connect said control members and said reciprocal member whereby said reciprocal member is adapted to be moved to its operative position by movement of said control members to their operative position, and said control members are adapted to be moved to their inoperative positions by movement of said reciprocal member to its inoperative position, said motion transmitting means including a releasable latch mechanism adapted to alternately engage and release said reciprocal member, and arranged to necessitate movement of both of said control members to their full inoperative position at the end of each cycle of the machine in order to again latch said motion transmitting means to said reciprocal member.

23. In a cutting machine the combination of a driving mechanism, a driven mechanism, a normally disengaged clutch for connecting the two together, fluid operated means for engaging said clutch, a normally actuated brake for stopping said driven mechanism, fluid operated means for releasing said brake, a pipe line for conducting a fluid under pressure and connected to both of said fluid operating means for engaging said clutch and disengaging said brake, three normally closed valves in said pipe line and requiring simultaneous actuation for admitting a fluid to said pipe line to start the machine, a pair of manual control members for operating two of said valves and spaced from one another so as to require the use of both hands for operating the same, a reciprocal member adapted to be moved to an operative position wherein it engages and opens said third valve, means associated with said driven mechanism adapted to engage and move said reciprocal member from its operative position at a given time in each cycle of the machine for automatically stopping the machine, motion transmitting means adapted to connect said control members and said reciprocal member whereby said reciprocal member is adapted to be moved to its operative position by movement of said control members to their operative position, and said control members are adapted to be moved to their inoperative positions by movement of said reciprocal member to its inoperative position, said motion transmitting means including a whiffle tree connection between said two control members requiring a simultaneous operation of the two for transmitting the necessary movement to said reciprocal member to move it to its operative position, and including a releasable latch mechanism adapted to alternately engage and release said reciprocal member, and arranged to necessitate movement of both of said control members to their full inoperative position at the end of each cycle of the machine in order to again latch said motion transmitting means to said reciprocal member.

24. In a cutting machine the combination of a driving mechanism, a driven mechanism, a normally disengaged clutch for connecting the two together, fluid operated means for engaging said clutch, a normally actuated brake for stopping said driven mechanism, fluid operated means for releasing said brake, a pipe line for conducting a fluid under pressure and connected to both of said fluid operating means for engaging said clutch and disengaging said brake, three normally closed valves in said pipe line and requiring simultaneous actuation for admitting a fluid to said pipe line to start the machine, a pair of manual control members for operating two of said valves and spaced from one another so as to require the use of both hands for operating the same, a reciprocal member adapted to be moved to an operative position wherein it engages and opens said third valve, means associated with said driven mechanism adapted to engage and move said reciprocal member from its operative position at a given time in each cycle of the machine, a motion transmitting means adapted to connect said hand controls and said reciprocal member whereby said reciprocal member is adapted to be moved to its operative position by the simultaneous operation of said control members and said hand control members are adapted to be moved to their inoperative position by movement of said reciprocal member to its inoperative position, said motion transmitting means including an arm adapted to be moved by movement of said control members to their operative position, a lost motion connection between said arm and said reciprocal member, a latch pivoted to said arm and adapted to positively engage and release said reciprocal member, means disengaging said latch from said reciprocal member when the latter has reached its operative position, means normally moving said latch to its release position, and means for returning said latch to engaging position relative to said reciprocal member after said reciprocal member has been returned to its inoperative position, said last mentioned means adapted to become effective only when both control members are returned to their inoperative positions whereby an accidental repeat of the machine is positively prevented.

25. In a cutting machine the combination of a driving mechanism, a driven mechanism including a bull gear, a normally disengaged clutch for connecting the two together, fluid operated means for engaging said clutch, a normally actuated brake for stopping said driven mechanism, fluid operated means for releasing said brake, a pipe line for conducting a fluid under pressure and connected to both of said fluid operating means for engaging said clutch and disengaging said brake, three normally closed inlet valves in series in said pipe line in advance of said two fluid operating means, a normally closed main exhaust valve in said pipe line, a pair of pivoted manual control members for operating two of said valves and spaced from one another so as to require the use of both hands for operating the same, a reciprocal member adapted to be moved between an operative position, wherein it engages and opens said third valve, and an inoperative position, wherein it opens said exhaust valve, a cam on said bull gear adapted to engage and move said reciprocal member to its inoperative position from its operative position at a given point in each cycle of the machine, and motion transmitting means adapted to connect said control members and said reciprocal members whereby said reciprocal member is adapted to be moved to its operative position by the simultaneous operation of said control members, and said control members are adapted to be moved to their inoperative position by movement of said reciprocal member to its inoperative positions, said motion transmitting means including a pivoted bell crank, a lost motion connection between one arm of said bell crank and said reciprocal member, a latch pivoted to said arm and adapted to positively connect said reciprocal member to said arm to be moved by the same, a whiffletree connection between said control members and said arm whereby the simultaneous operation of both control members is required to move said arm sufficiently to move said reciprocal member to its operative position, means for automatically releasing said latch when said reciprocal member reaches its operative position, and means for re-engaging said latch with said reciprocal member when the latch is in its inoperative position, said last mentioned means adapted to operate only when both control members are moved to their full inoperative positions simultaneously, whereby an accidental repeat of the machine is prevented.

HAYWOOD G. DEWEY.
EDWARD P. FLYNN.